May 20, 1958     J. KOHUT, JR     2,835,476
AIR CONDITIONING APPARATUS
Filed June 18, 1954     3 Sheets-Sheet 1
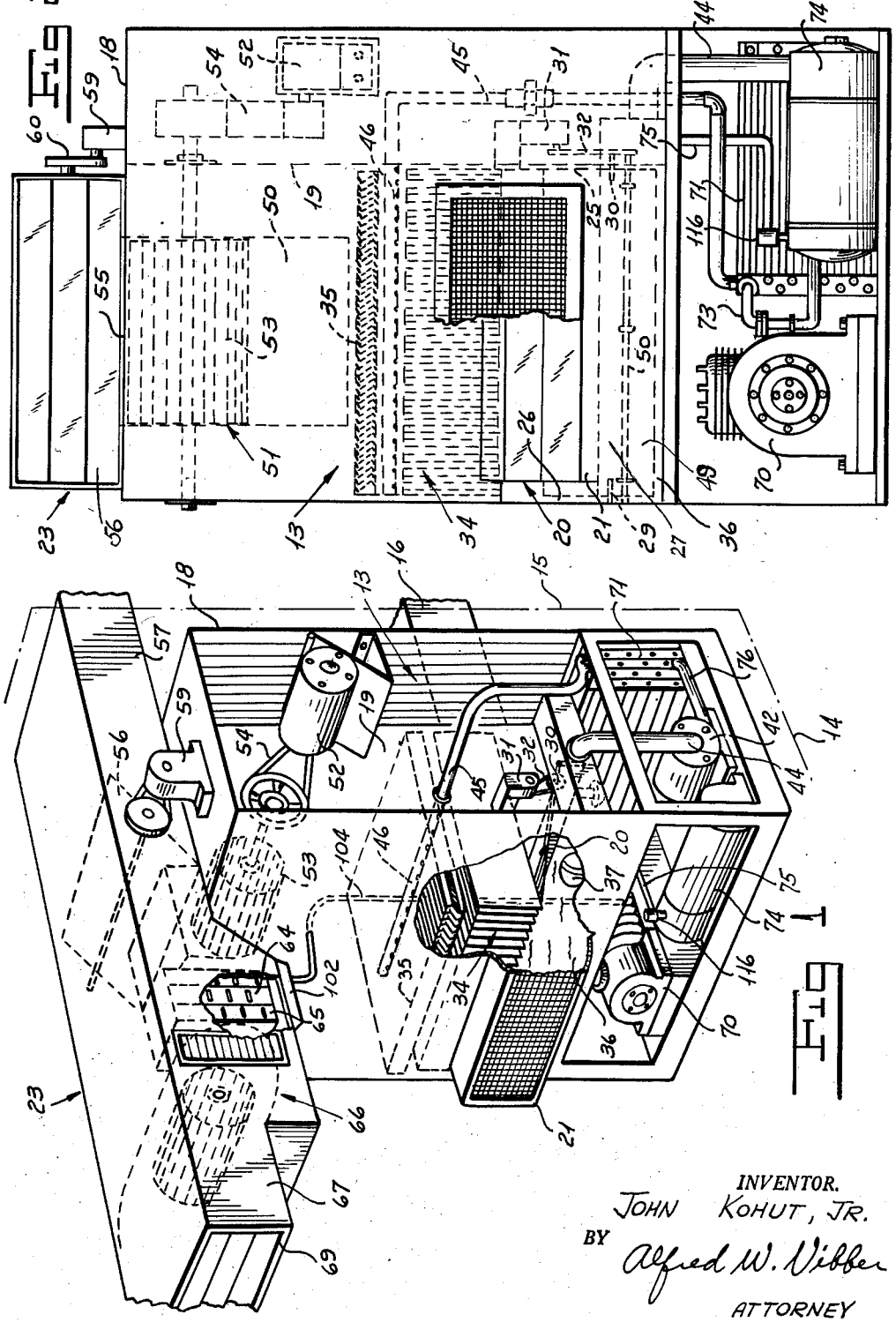
INVENTOR.
JOHN KOHUT, JR.
BY Alfred W. Vibber
ATTORNEY

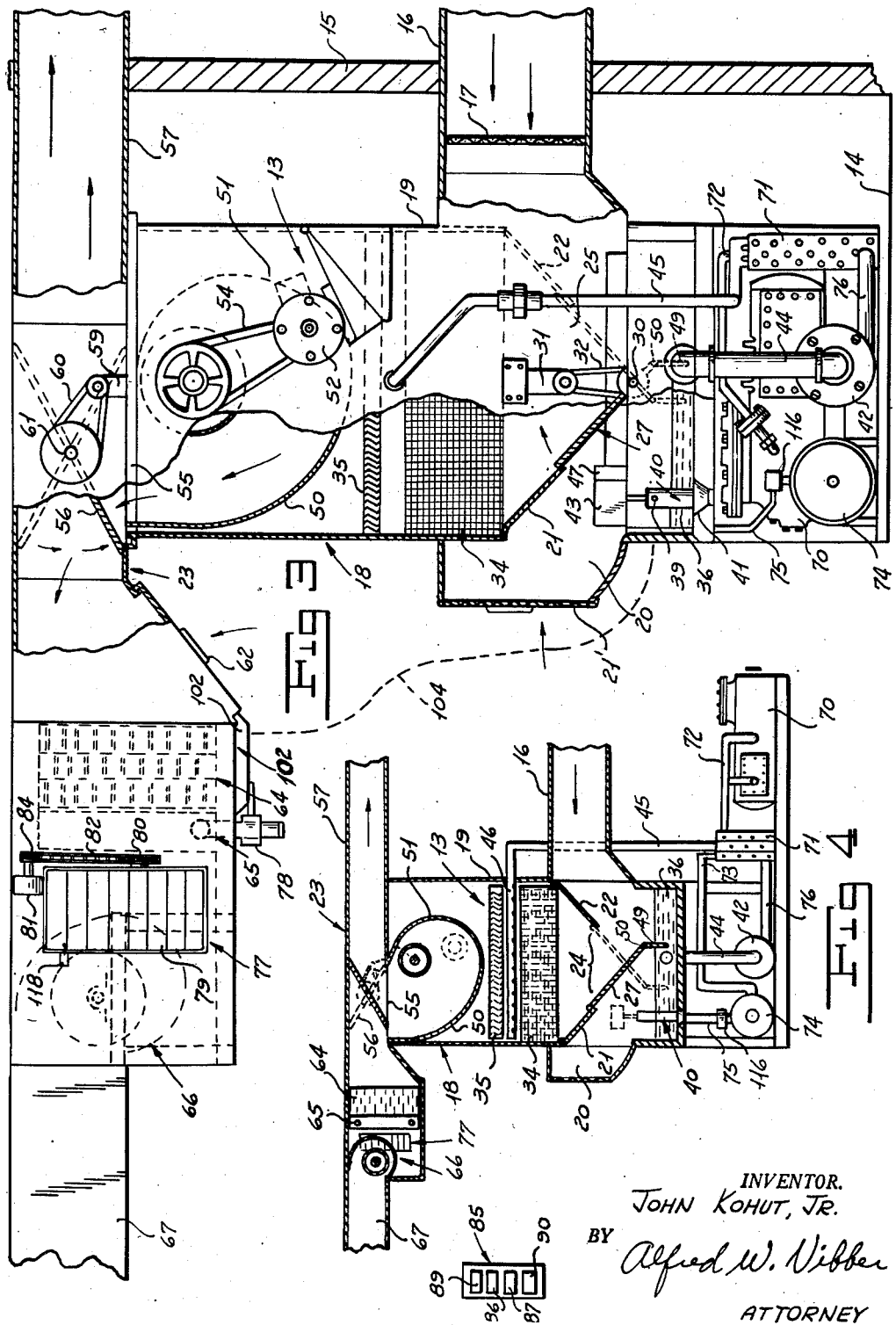

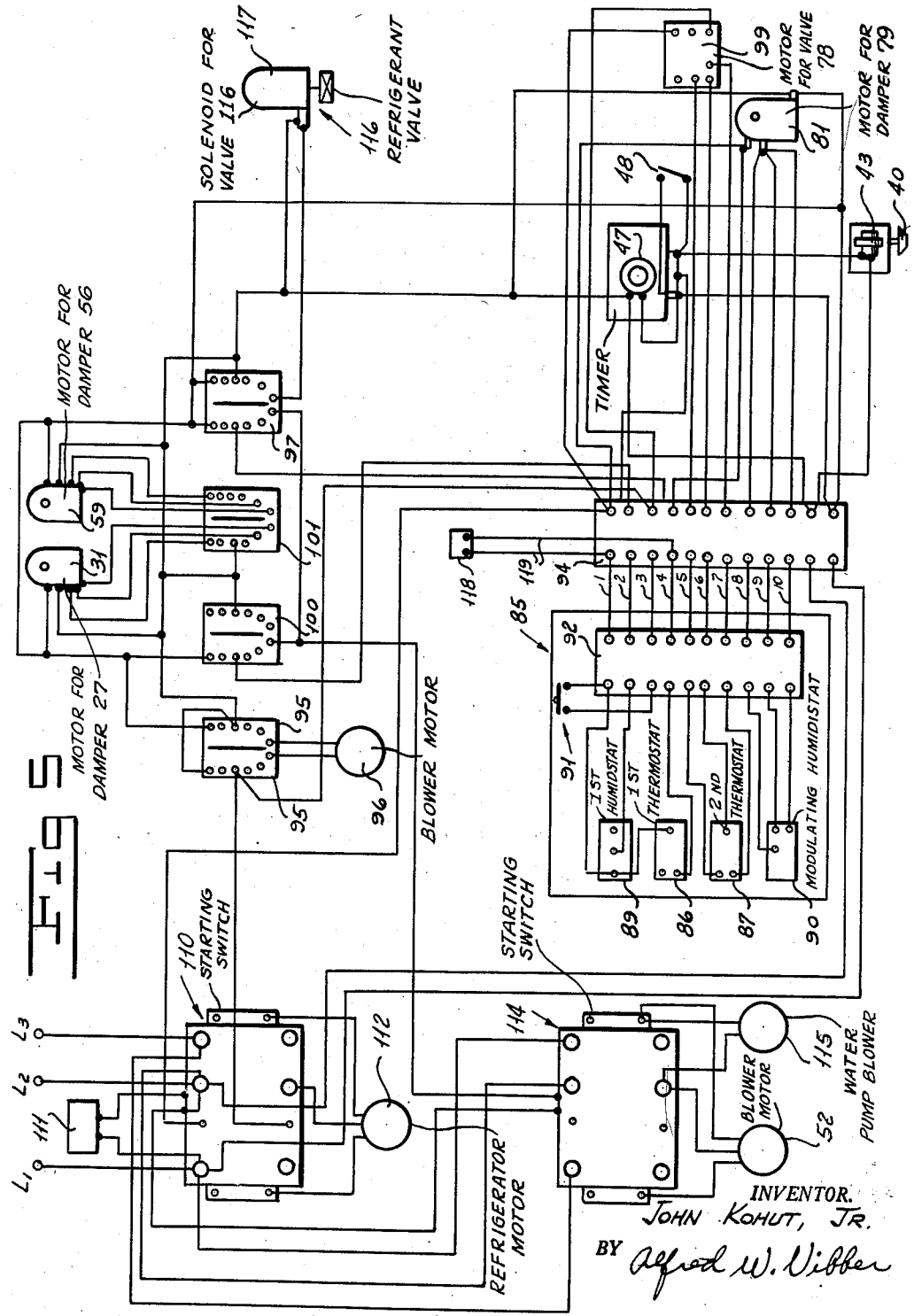

United States Patent Office 2,835,476
Patented May 20, 1958

2,835,476
AIR CONDITIONING APPARATUS

John Kohut, Jr., Boonton, N. J.

Application June 18, 1954, Serial No. 437,795

7 Claims. (Cl. 257—3)

This invention relates to an improved air conditioning system.

The air conditioning apparatus of the invention is constructed to include in one unit means for the year-round conditioning of air as required, for example, in a factory requiring a closely controlled atmosphere. The apparatus provides humidification or dehumidification of the air, as required, and heating or cooling of the air, also as required. The apparatus is such as particularly to lend itself readily to the substantially completely automatic control of its parts by air-responsive thermostats and humidistats. The apparatus, as incidents of the above operations, also washes the air, filters it, and continuously changes it in the space the air of which is conditioned by the apparatus. The cooling device of the apparatus is preferably a self-contained refrigerator unit, the heat exchanger of which is cooled by the water continuously recirculated through the air-humidifying device of the apparatus. As a consequence the water-supply demands of the apparatus are very small, and preferably are discontinuous.

The invention has among its objects the provision of an improved simplified air conditioning apparatus.

A further object of the invention lies in providing an air conditioning apparatus wherein there is provided in one unit means for humidifying, dehumidifying, heating, and cooling, as required, of the air under its control.

Still further objects of the invention reside in the provision in air conditioning apparatus of a novel automatic air mixer, of means for automatically draining the humidifying and cooling water containing sump periodically, and of a novel combination of a water-evaporating air-humidifying means with air circulating means operating through selectively different paths, preferably under the automatic control of air humidity and temperature sensing means, whereby the humidity and temperature of the air delivered by the apparatus are maintained within narrow desired ranges.

Another object of the invention is to provide an air-humidifying apparatus having a refrigerating unit associated therewith, the heat exchanger of the refrigerating unit being cooled by the recirculated water of the humidifying unit, whereby the water-supply demand of the apparatus is minimized.

The above and further objects of the invention, such as economies of manufacture, installation, and use will become apparent in the following description.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplaeed applying my invention is illustrated in the accompanying drawings forming part of this specification, in which:

Fig. 1 is a view in perspective of a preferred embodiment of the air conditioning apparatus of the invention, parts of the front housing panel of the lower part of the unit and of the duct at the top of the unit being broken away, the exposed side housing panel and the lower front panel of the lower part of the unit being removed.

Fig. 2 is a view in front elevation of the apparatus, the lower front panel being removed and the various parts of the apparatus within the housing being indicated in dotted lines.

Fig. 3 is a view of the apparatus in a generally vertical central section, certain parts of the apparatus being shown in elevation.

Fig. 4 is a somewhat simplified extended layout of the apparatus as a whole, indicating the various possible paths of air flow therethrough and the various air sensing instruments controlling the apparatus.

Fig. 5 is a somewhat simplified wiring diagram of the apparatus indicating the interconnection between the various units and their controls.

The apparatus of the preferred embodiment shown has a lower, generally rectangular box-shaped portion 13, contained in a housing 18, and an upper, rearwardly and forwardly extending duct-like air-distributing structure 23 mounted on the top of housing 18. The apparatus is shown as being mounted on a floor 14 adjacent a wall 15, although it is to be understood that the apparatus may be mounted on an elevated, overhead support, and remote from a wall, if desired. Portion 13 of the apparatus comprises means for selectively admitting air from either the atmosphere outside the building or from inside the building which is being air-conditioned, means for drawing the air through an air humidity adjusting structure, and means for forwarding such humidity-adjusted air to the air-distributing structure 23. The air-distributing structure includes means whereby the forwarded air may selectively be discharged in the required volume to the building space, being further conditioned in its travel by either heating or cooling means. The cooling means takes the form of a refrigerator evaporator supplied with refrigerant by a compressor located in the lower portion 13 of the apparatus. In accordance with the invention the heat exchanger of the compressor unit is cooled by the water continuously recirculated through the air-humidity adjusting structure, so that the apparatus requires the supply of only a small amount of periodically supplied water.

Within the housing 18 is a large vertically extending box-like chamber 19 extending from the top of portion 13 to somewhat below the middle of such lower portion of the apparatus. The front, rear, and left-hand ends of the chamber 19, as shown in Fig. 1, are poistioned close to the corresponding panels of the housing 18; the right-hand end of chamber 19 is spaced appreciably from the right-hand panel of housing 18, as shown in Fig. 2, to provide space for various mechanisms to be described. The chamber 19 terminates at its lower end in the mixing chamber or compartment 20, as most clearly shown in Fig. 2, the front and rear lower end members 21, 22, respectively, of chamber 19 being inclined downwardly and toward the vertical central axis of chamber 19. A large opening 24 is provided between the lower ends of members 21 and 22. The lower ends of the right- and left-hand end panels 25 and 26, respectively, of chamber 19 are of triangular shape, and have their apices vertically centrally below chamber 19.

Mounted on panels 25 and 26, substantially at their apices, is the mixing valve or damper member 27, which is supported on stub axles 29 and 30 for oscillation between the full line and dotted line positions shown in Figs. 3 and 4. The member 27, as will appear, is selectively positionable so that the air drawn into the lower end of chamber 19 may be drawn exclusively from the outer atmosphere or from the space within the building. A duct 16, equipped with an air filter 17, provides for the passage of outside air into chamber 20. An inlet opening 21' provides for the passage of inner air into chamber 20. When damper member 27 is in its full line position, all the air entering chamber 19 is outside air. When member 27 is in its dotted line position, all the air entering chamber 19 is inner air. The positioning of member 27 is controlled by the motor 31, which drives the member through the medium of chain 32 entrained over sprockets on the motor shaft and axle 30, the motor 31 being so controlled, as will appear, so that member 27 is maintained in the full line position under normal conditions in which the apparatus cools and dehumidifies the air entering the building. Motor 31 may be, for example, a "Crise" motor, made by Crise Controls Div., Acro Mfg. Co.

Positioned at the lower end of the main, rectangular portion of chamber 19 is an evaporative structure designated by the character 34. Structure 34 is preferably of the type shown in Patent No. 2,498,427, of John Kohut, Sr. In such structure, water is distributed over the surfaces of vertically disposed spaced plates. Currents of air rising through structure 34, created by blowers to be described, are caused alternately to expand and contract in their passage between plates, such currents breaking off the films of water on the plates. As a result, the sensible heat in the incoming air is converted into latent heat, causing complete air saturation. A water eliminator 35, to catch any water droplets or bubbles, is disposed above the evaporative structure.

The water, which may be recirculated through structure 34, is supplied from the tray-like water reservoir 36 disposed vertically beneath chamber 19. The pump 42, driven by a motor 115 (Fig. 5) in the base of the portion 13 of the apparatus, receives water from reservoir 36 through pipe 44 and forces it through pipe 45 to a series of spray pipes 46 (one shown) above structure 34. The level of the water is kept within desired limits by a supply valve, not shown, under the control of a conventional ball float 37 (Fig. 1), and an overflow opening 39 in a discharge device 40 which connects to a passage (not shown) leading to a discharge sump. Device 40 is in the nature of a tubular valve member having a lower frusto-conical end 41 which seals a similarly shaped opening in the bottom of reservoir 36. The device 40 is periodically raised by a solenoid 43 controlled by a time clock device 47 which may be set to discharge the contents of the reservoir at predetermined intervals such as once every 24 hours. Drain device 40 may be raised whenever desired by closing the energizing circuit for the solenoid 43 by the manual switch 48 (Fig. 5) the circuit of which by-passes the timer 47. As a result, the water in the reservoir is periodically replaced, the dust and other solid material entrained in the water with which the evaporative structure is sprayed being thus eliminated. Means 40 has a vertical passage therethrough so that when it is made of the proper length it serves as an overflow device when it is in lowered seated position in the sump.

In order to seal in a simple effective manner the lower edge of the mixer valve 27 against the escape of air past it, the valve is provided on its lower edge with a depending vane-like weight 49 having a width equal to that of member 27, the upper edge of which is freely hinged at 50 to the lower edge of member 27. The vertical dimension of member 49 is such that its lower edge lies beneath the surface of the water normally maintained in reservoir 36, thereby preventing the passage of air from either of sources 16 and 21' around it. In addition, the member 49 functions partially to counterbalance the weight of member 27, thus allowing the valve or damper member as a whole to be turned more easily.

After rising through the evaporative structure 34 and drop eliminator 35, the incoming air enters the housing 50 of blower 51, the rotor 53 of which is driven by motor 52 through the medium of belt 54 which engages a pulley on the motor shaft and a larger pulley on the blower rotor shaft. The air from blower 51 is discharged from the top of portion 13 of the apparatus, through the opening 55 therein, into the horizontal duct-like delivery portion 23.

The thus discharged air is under the control of the damper or butterfly valve member 56 which is mounted on stub axles, similar to axles 29 and 30, at its center line so as to be selectively swung from the full line to the dotted line position shown in Figs. 3 and 4. When in its full line position, member 56 closes the portion of duct 23 to the left in Fig. 3 and causes all of the air delivered by blower 51 to travel to the right into the atmosphere outside the building. When member 56 is in its dotted line position it causes all the air delivered by blower 51 to travel to the left in the exhaust duct 23 to the space within the building. Valve member 56 is under the control of damper motor 59, which may also be a "Crise" motor. Motor 59 is drivingly connected to the damper by means of the chain 60 entrained over a sprocket on the motor shaft and a larger sprocket on the stub axle 61 affixed to valve member 56. The motor 59, as will appear, is so controlled that member 56 is maintained in the full line position under normal conditions in which the apparatus cools and dehumidifies the air entering the building.

Air discharged to the left through duct 23 is mixed with air from the building which is drawn in through the normally open port 62 in the duct work by the rush of treated air delivered by blower 51. In its further travel to the left the air in duct 23 passes through a selectively operated refrigerator cooling coil 64 positioned in the duct, and through a selectively operated air-heating heat exchanger 65, also positioned in the duct. Finally, if desired, the pressure of the air thus treated may be additionally raised by a second blower 66 positioned in the delivery duct to thrust the air along exhaust portion 64 of the duct and out the one or more delivery openings, such as 69 shown in Fig. 1, into the building.

The cooling coil or evaporator 64 is supplied with compressed refrigerant by the compressor 70, which preferably is of the hermetically sealed, motor-containing type. The compressor receives expanded gaseous refrigerant from coil 64, compresses it, and delivers it to the heat exchanging condenser 71 through pipe 72. From condenser 71 the now liquid refrigerant is led through pipe 73 to tank 74, from which it is fed to the cooling coil 64 through a solenoid operated valve 116 and pipe 75.

The condenser 71 is of the heat exchanger type and is cooled by water circulated through it in heat exchanging relationship with the refrigerant. The water is that in sump or reservoir 36, such water being forced by pump 42 through pipe 76 to condenser 71, and thence into the previously mentioned pipe 45 leading to the spray pipes above the evaporative structure 34.

The selectively heated coil 65 may be heated, for example, by steam under pressure circulated therethrough. A remotely controlled motor operated steam valve, such as that shown schematically at 78 in Figs. 3 and 5, may be used to control the heat output of coil 65. As will appear from the discussion of Fig. 5, the operation of the cooling coil 64 and that of the heating coil 65 are under the automatic control of temperature sensing instruments mounted within the air conditioned building.

The duct 23, at a location inwardly of the building of cooling coil 64 and heating coil 65, is provided with a by-pass damper 77. When damper 77 is open, the air drawn into blower 66 is that from the building. When damper 77 is closed, the air entering blower 66 is that which has travelled through coils 64 and 65 in duct 23.

As will also appear hereinafter, damper 77 is under the control of a modulating humidistat 90 within the building, the damper being closed when the preset relative humidity on such humidistat is satisfied within the building and being opened when the relative humidity in the building is above the said preset relative humidity on the modulating humidistat. The controls for the device as a whole are such that when the damper 77 opens, the refrigerator unit is started.

The by-pass damper shown consists of a plurality of interlinked slats or louvers 79 mounted to pivot on horizontal axes, the stud axle of the central louver being extended to the side and carrying a sprocket 80. A damper actuating motor 81, which likewise may be a "Crise" motor, selectively drives damper 77 from closed to open position, and vice versa, through the medium of a chain 82 entrained over the sprocket 80 and a sprocket 84 on the shaft of such damper motor.

In Fig. 5 there is shown a somewhat simplified wiring diagram of the apparatus, showing the manner of interconnection between the main units of the apparatus and their control devices. Power for the system is derived from a three-phase 220 volt source, through a conventional fused main switch (not shown) feeding main wires $L_1$, $L_2$, and $L_3$. These three wires lead to the starter 110 for the motor 112 for the refrigerator compressor 70. A conventional switch 111, responsive to pressure of refrigerant in pipe 75, is connected as shown to starter 110. Such switch shuts off motor 112 when the refrigerant pressure exceeds a predetermined value. The three main wires are also led to the starter 114 for the motor 52 for blower 51 and motor 115 for water pump 42.

Within the building being air conditioned by the apparatus, there is located the room control panel 85 bearing a first thermostat 86, which controls the cooling function of the apparatus, a second thermostat 87, which controls the heating function of the apparatus, a first humidistat 89, and a second, modulating, humidistat 90. The panel 85 also carries a manually operated switch 91, whereby the motor for blower 66 may be constantly operated even though the other controls do not demand or cause it. Also carried on the panel, at its rear, is the pole block 92.

The thermostats 86 and 87 may be, for example, those designated model EYDA-3 wire-S. P. D. T., made by Barber-Coleman. The first humidistat 89 may be one designated model KYDA 1, S. P. D. T., made by Barber-Coleman. The modulating humidistat 90 may be one designated type H93A1X1 made by Minneapolis-Honeywell Regulator Company.

The instruments and switch on panel 85 are connected as shown to poles 1–10, inclusive, of pole block 92. Control wires, designated by the same numbers as their poles, extend from the poles of block 92 to the correspondingly numbered poles of the second pole block 94, mounted in the base of portion 10 of the air conditioning apparatus. As will be apparent from Fig. 5, manual switch 91 opens or closes the circuit represented by the wire 3, which in turn de-energizes or energizes, respectively, the relay 95 to control the motor 96 of blower 66. Thermostat 86 operates to close the circuit represented by the wire 4 when the temperature of the room rises above a preset value, and to open such circuit when the temperature of the room reaches or drops below such preset value. Such last circuit, when closed, actuates relay 97 through an obvious circuit to energize the solenoid 117 of valve 116, thereby to open the valve. Additionally, relay 101 controls the actuation of damper motors 31 and 59, for dampers 27 and 56, respectively.

Thermostat 87 is connected as shown to wires 5, 6, and 7 which are in turn connected to the appropriate poles of the motor 99 of motorized steam valve 78. When the demands of the thermostat 87 are satisfied, that is, when the room temperature is at or above the temperature preset thereon, the motor 99 is operated to close valve 78. When the room temperature is below that preset on thermostat 87, motor 99 is operated to open steam valve 78.

The humidistat 89 has its single control wire leading to pole No. 2 of block 92, from there to block 94 and thence to the relay 100. Relay 100 controls, in turn, the relay 101 which operates the damper motors 31 and 59. When the demands of humidistat 89 are met, that is, when the relative humidity of the air in the room is at or above that preset on instrument 89, relay 100 is de-energized, relay 101 is deenergized, and damper motors 31 and 59 are in that terminal position of their travel which places dampers 27 and 56, respectively, in their full line positions (Figs. 3 and 4). In such positions of the dampers the air travelling through the evaporative unit 34 is isolated from the room, being drawn in from, and discharged to, the atmosphere outside the building. When the humidity of the air in the room is below that preset on humidistat 89, such humidistat functions to energize relay 100, and through it, relay 101. Damper motors 31 and 59 and then operated to cause their respective dampers to assume their dotted line posiitons (Fig. 3 and 4), and remain in this positon so long as the hmidity demands of instrument 89 are not satisfied. In such dotted line position of dampers 27 and 56, air enters evaporative unit 34 from the room through opening 21, and leaves unit 34 to flow into the room through duct 23. As a result, the humidity in the room is progressively increased when dampers 27 and 56 are in their dotted line positions.

The modulating humidistat 90 has its three poles connected as shown to the wires 8, 9, and 10, the circuits of such wires leading to the respective poles of the motor 81 of by-pass damper 77. When the humidity of the room is at or below the relative humidity preset on instrument 90 the motor 81 is operated to close damper 77. When the relative humidity of the room exceeds such preset value, motor 81 is operated by humidistat 90 to open the by-pass damper 77. At the same time motor 112 of the refrigerating unit of the apparatus is automatically started. Such starting of the motor 112 is effected by the closing of a microswitch 118 mounted on the delivery duct by the interaction of a slat of damper 77 and the operating arm of the switch 118. The closing of switch 118, which is connected to poles 1 and 4 of block 94 by wires 119, energizes the solenoid 116 of valve 117 thereby to open the valve. This raises the pressure of the refrigerant in the system and starts the motor 112 of the refrigerator by operation of the conventional refrigerant pressure responsive switch.

As apparent from the above, the air conditioning apparatus of the invention provides means for the year-round conditioning of air, as required. The apparatus selectively provides humidification or dehumidification of the air, as required, and heating or cooling of the air, also as required. When the control instruments on panel 85 are set appropriately, the apparatus will automatically function to maintain the air within the room at a desired temperature and relative humidity, regardless of the season. The operation of the apparatus will be better understood by consideration of typical cycles of operation under differing atmospheric conditions.

THE COOLING CYCLE

(a) Cooling only

It will be assumed here that the season is summer and that the air being conditioned must be cooled. Assuming that at first the temperature within the building exceeds that preset on thermostat 86, such thermostat will function to close the circuit represented by the wire 4. This energizes relay 97, which thereupon opens valve 116 and starts the motor for the refrigerator compressor by energizing starter 110 and then in turn relay 95.

Starter 114 is also energized at this time by the operation of relay 97. As a result, the motors 52 and 96 of blowers 51 and 66, respectively, and the motor 115 for the water pump 42 are started. The damper motors 31 and 59 will have been initially in the full line positions shown in Figs. 3 and 4 or, if they are not, they will be moved to such positions by energization of their motors by operation through relay 101. The dampers 27 and 56 are, as explained, always in the full line position shown, unless humidification of the air in the building is required.

It will be assumed at the moment that the air in the building has the correct relative humidity so that the circuit from humidistat 89 remains open. Under the assumed conditions, therefore, the air entering through duct 16 rises through the evaporator unit 34 and, being discharged through the duct 57, serves to abstract heat from the water circulated through the evaporator unit and thus from the heat exchanger of the refrigerator compressor.

Under the assumed condition of proper relative humidity, air in the room enters the delivery end of duct 23 through aperture 62, passes through the cooling coil 64, and is discharged through the duct 67 under the impetus of the blower 66. When the temperature in the room has been reduced to or below the temperature preset on thermostat 86, the refrigerator motor and the motors 52, 96, and 115 are de-energized.

(b) *Cooling and humidification*

The apparatus of the invention incorporates means whereby, if during the cooling cycle the relative humidity of the air in the room is too low, humidified air is automatically added to that discharged into the room by the apparatus so as to restore the relative humidity of the air in the room to the correct value. The previously described first humidistat 89 will be set to a desired value. If the air in the room has a relative humidity less than such preset value, the circuit represented by the wire 2 is closed. Thereupon, relay 100 is energized and damper motors 31 and 59 are energized thereby to turn the dampers 27 and 56 into the dotted line positions. With the dampers in such positions, the air travelling through the evaporative unit 34 enters from the room through inlet 21 and is discharged to the left into duct 23. The humidity of such discharged air, of course, is much higher than that required in the room, and so, when mixed with the remaining air in the room, it quickly brings the relative humidity of the air to the correct value. When the demands of humidistat 89 are met, it opens the circuit represented by the wire 2, thereby restoring the dampers 27 and 56 to their full line position.

(c) *Cooling and dehumidification*

At times the relative humidity of the atmosphere will be very high, so that the relative humidity of the air in the room, if uncorrected, would exceed that desired. To take care of this condition, there is provided the modulating humidistat 90, which controls the operation of the by-pass damper 77. When the relative humidity of the air in the room is above the value preset on humidistat 90, the circuit represented by the wires 8, 9, and 10 is so energized as to cause damper motor 81 to hold the by-pass damper 77 in open position. When, however, the relative humidity of the air in the room is below the preset value on humidistat 90, the circuit represented by the wires 8, 9, and 10 is so energized that the damper motor 81 closes the by-pass damper 77.

Under the first condition, of course, the first humidistat 89 will hold the dampers 27 and 56 in their full line positions. Circulation of the air in the room by the unit, therefore, is confined to that produced by the blower 66 and its associated mechanism in the left-hand end of the duct 23. When the by-pass damper 77 is open, under such conditions, only a part of the air circulated by the unit passes through the cooling coil 64, the remainder entering through open damper 77. As a result, under such conditions, removal of moisture from the air proceeds at a much faster rate. Such removed water is caught in a tray 102 below the coil 64, the water in the tray being led through the pipe 104 back to the sump 36 of the apparatus. When sufficient moisture has been removed from the air, the relative humidity of the air in the room will drop below the value preset on humidistat 90. The circuit represented by wires 8, 9, and 10 thereupon energize damper motor 81 so as to close the by-pass damper 77. When the by-pass damper 77 is closed, under such conditions, air from the room enters aperture 62, passes through the coils 64 and 65, and is discharged through duct 67. When the coil 64 is cooled by the refrigerator compressor, substantial amounts of moisture from the air circulated therethrough are deposited on it, so that the air in the room is progressively dehumidified.

Under such conditions the temperature of the room may satisfy that demanded by the thermostat 86 so that the refrigerator compressor motor will not operate as a result of any demand for cooling. At the same time, dehumidification of the air may be required under this condition. Accordingly, a circuit from the microswitch on the damper motor is provided to energize the refrigerator compressor motor 81, when the by-pass damper 77 is open and for deenergizing such motor when the by-pass damper 77 is closed.

As relative humidity increases above the preset value on thermostat 90, the by-pass damper 77 in turn opens proportionately to operate in conjunction with thermostat 90.

ROOM HEATING

The heating coil 65 may be any conventional space heater such as a steam coil, a gas fired convection unit, or a hot water heater. As above explained, the control valve 78 of coil 65 is under the control of the second thermostat 87, the circuit between such thermostat and the motor 99 of the valve 76 being represented by the wires 5, 6, and 7. Thermostat 87 and motor 99 are so constructed and interconnected that, when the demands of the thermostat 87 are satisfied, motor 99 closes the valve 78, and when the temperature of the room is below that preset on thermostat 87, motor 99 opens the valve 78.

When normal settings have been made on the control instruments on panel 85, the refrigerating portion of the apparatus will normally be inactive during the heating season. Thus, the dampers 27 and 56 will normally be in their full line position whereby atmospheric air is isolated from the air in the room. If, however, during the heating cycle, the humidity of the air in the room is too low, humidistat 89 will operate to cause damper motors 31 and 59 to turn their respective dampers into the dotted line position. As we have seen above, under such conditions the direction of air flow through the unit is from the room through the evaporative unit and back to the room. When the humidity demands of the room have been satisfied, dampers 27 and 56 return to their full line position. Consequently, the apparatus of the invention functions to maintain a proper value of relative humidity of the air in the room at all times.

I claim:

1. An air conditioning unit adapted to be located in a building, comprising: an elongated duct having an inlet end and an outlet end, a first inlet means providing for the inlet of air from the atmosphere outside the building to the inlet end of the duct, a second inlet means providing for the inlet of air from the interior of the building to the inlet end of the duct, air humidifying means in the duct between the inlet and outlet ends thereof, the last named means comprising a series of spaced air guiding means, means to maintain the air guiding means covered with a film of water, comprising a spray pipe, a sump beneath the air guiding means, and means to circulate water from the sump to the spray pipe, a first outlet means providing for the outlet of air to the atmosphere from the outlet end of the duct, a second outlet means providing for the outlet of air to the interior of the building, means at the inlet and outlet ends of the duct for selectively alternatively directing air through the duct in a first path from the first inlet means to the first outlet means and a second path from the second inlet means to the second outlet means, a refrigerator coil through which the air travelling in the second path passes, means allowing the entry of air in the building into the second path in advance of the travel of the air through the refrigerator coil a refrigerator compressor for supplying compressed refrigerant to said coil, and means providing for heat exchange between the compressed refrigerant delivered by the compressor and the supply of water circulated through the air humidifying means.

2. An air conditioning unit adapted to be located in a building, comprising: an elongated duct having an inlet end and an outlet end, a first inlet means providing for the inlet of air from the atmosphere outside the building to the inlet end of the duct, a second inlet means providing for the inlet of air from the interior of the building to the inlet end of the duct, air humidifying means in the duct between the inlet and outlet ends thereof, the last named means comprising a series of spaced air guiding means, means to maintain the air guiding means covered with a film of water comprising a spray pipe, a sump beneath the air guiding means, and means to circulate water from the sump to the spray pipe, a first outlet means providing for the outlet of air to the atmosphere from the outlet end of the duct, a second outlet means providing for the outlet of air to the interior of the building, means at the inlet and outlet ends of the duct for selectively alternatively directing air through the duct in a first path from the first inlet means to the first outlet means and a second path from the second inlet means to the second outlet means, room humidity responsive means for controlling the positioning of the air directing means, a refrigerator coil through which the air travelling in the second path passes, means allowing the entry of air in the building into the second path in advance of the travel of the air through the refrigerator coil a refrigerator compressor for supplying compressed refrigerant to said coil, and means providing for heat exchange between the compressed refrigerant delivered by the compressor and the supply of water circulated through the air humidifying means.

3. An air conditioning unit adapted to be located in a building, comprising: an elongated duct having an inlet end and an outlet end, the first inlet means providing for the inlet of air from the atmosphere outside the building to the inlet end of the duct, a second inlet means providing for the inlet of air from the interior of the building to the inlet end of the duct, a first damper means selectively operable to confine the air entering the duct to that from either the one or the other of such inlet means, air humidifying means in the duct between the inlet and outlet ends thereof, the last named means comprising a series of spaced vertical air guiding means, means to maintain the air guiding means covered with a film of water comprising a spray pipe, a sump beneath the air guiding means, and a pump to circulate water from the sump to the spray pipe, a first outlet means providing for the outlet of air to the atmosphere from the outlet end of the duct, a second outlet means providing for the outlet of air to the interior of the building, a second selectively operable damper means cooperating with the two said outlet means so as to confine the path of egress of the air to either one or the other of such means, and means controlling the two dampers as a unit whereby they selectively alternatively direct air through the duct at a first path from the first inlet means to the first outlet means and a second path from the second inlet means to the second outlet means, a refrigerator coil through which the air travelling in the second path travels, means allowing the entry of air in the building into the second path in advance of the travel of the air through the refrigerator coil a water jacketed heat exchanging condenser, a refrigerator compressor for supplying compressed refrigerant to the condenser, means leading the refrigerant from the condenser to the coil, the water jacket of the condenser being interposed between the pump and the spray pipe and being supplied with water from the sump.

4. An air conditioning unit adapted to be located in a building, comprising: an elongated duct having an inlet end and an outlet end, the first inlet means providing for the inlet of air from the atmosphere outside the building to the inlet end of the duct, a second inlet means providing for the inlet of air from the interior of the building to the inlet end of the duct, a first damper means selectively operable to confine the air entering the duct to that from either the one or the other of such inlet means, air humidifying means in the duct between the inlet and outlet ends thereof, the last named means comprising a series of spaced vertical air guiding means, means to maintain the air guiding means covered with a film of water comprising a spray pipe, a sump beneath the air guiding means, and a pump to circulate water from the sump to the spray pipe, a first outlet means providing for the outlet of air to the atmosphere from the outlet end of the duct, a second outlet means providing for the outlet of air to the interior of the building, a second selectively operable damper means cooperating with the two said outlet means so as to confine the path of egress of the air to either one or the other of such means, and means controlling the two dampers as a unit whereby they selectively alternatively direct air through the duct at a first path from the first inlet means to the first outlet means and a second path from the second inlet means to the second outlet means, room humidity responsive means for controlling the positioning of the air directing means, a refrigerator coil through which the air travelling in the second path travels, means allowing the entry of air in the building into the second path in advance of the travel of the air through the refrigerator coil a water jacketed heat exchanging condenser, a refrigerator compressor for supplying compressed refrigerant to the condenser, means leading the refrigerant from the condenser to the coil, the water jacket of the condenser being interposed between the pump and the spray pipe and being supplied with water from the sump.

5. An air conditioning unit adapted to be located in a building comprising: an elongated duct having an inlet end and an outlet end, a first inlet means providing for the inlet of air from the atmosphere outside the building to the inlet end of the duct, a second inlet means providing for the inlet of air from the interior of the building to the inlet end of the duct, air humidifying means in the duct between the inlet and outlet ends thereof, a tray-like sump for the humidifying means positioned therebelow in the duct and below the first and second inlet means, a first outlet means providing for the outlet of air to the atmosphere from the outlet end of the duct, a second outlet means providing for the outlet of air to the interior of the building, cooling means positioned in said second outlet means, a first selectively positioned damper at the inlet end of the duct, said first damper being a horizontally journalled butterfly valve member positioned above the sump, such butterfly valve member having a freely hinged depending extension on its lower edge which dips into the liquid in the sump when the valve member is in either of its two terminal positions or is travelling therebetween, a second selectively positioned damper at the outlet end of the duct, and means controlling both dampers as a unit whereby selectively to direct air through the duct in a first path from the first inlet to the first outlet and in a second path from the second inlet to the second outlet.

6. An air conditioning unit adapted to be located in a building, comprising: an elongated duct having an inlet end and an outlet end, a first inlet means providing for the inlet of air from the atmosphere outside the building to the inlet end of the duct, a second inlet means providing for the inlet of air from the interior of the building to the inlet end of the duct, air humidifying means having a recirculated supply of water in the duct between the inlet and outlet ends thereof, a first outlet means providing for the outlet of air to the atmosphere from the outlet end of the duct, a second outlet means providing for the outlet of air to the interior of the building, means at the inlet and outlet ends of the duct for selectively alternatively directing air through the duct in a first path from the first inlet means to the first outlet means and in a second path from the second inlet means to the second outlet means, a refrigerator coil through which the air travelling in the second path passes, means allowing the entry of air in the building into the second path in advance of the travel of the air through the refrigerator coil a refrigerator compressor for supplying compressed refrigerant to said coil, means providing for heat exchange between the compressed refrigerant delivered by the compressor and the supply of water circulated through the air humidifying means, an air damper in the second outlet means for by-passing the cooling coil, a room humidistat for controlling the by-pass damper, and means for starting the compressor when the by-pass damper is opened.

7. An air conditioning unit adapted to be located in a building, comprising: an elongated duct having an inlet end and an outlet end, a first inlet means providing for the inlet of air from the atmosphere outside the building to the inlet end of the duct, a second inlet means providing for the inlet of air from the interior of the building to the inlet end of the duct, air humidifying means having a recirculated supply of water in the duct between the inlet and outlet ends thereof, a first outlet means providing for the outlet of air to the atmosphere from the outlet end of the duct, a second outlet means providing for the outlet of air to the interior of the building, means at the inlet and outlet ends of the duct for selectively alternatively directing air through the duct in a first path from the first inlet means to the first outlet means and in a second path from the second inlet means to the second outlet means, a refrigerator coil through which the air travelling in the second path passes, means allowing the entry of air in the building into the second path in advance of the travel of the air through the refrigerator coil a refrigerator compressor for supplying compressed refrigerant to said coil, means providing for heat exchange between the compressed refrigerant delivered by the compressor and the supply of water circulated through the air humidifying means, an air damper in the second outlet means for by-passing the cooling coil, a room humidistat for controlling the by-pass damper, means for starting the compressor when the by-pass damper is opened, means to heat the air travelling in the second path, and a room thermostat controlling the heating means.

References Cited in the file of this patent

UNITED STATES PATENTS

| | | |
|---|---|---|
| 1,673,732 | Brooks | June 12, 1928 |
| 1,889,895 | Henshall | Dec. 6, 1932 |
| 1,915,994 | Harnett | June 27, 1933 |
| 2,008,407 | Stoever | July 16, 1935 |
| 2,110,693 | Bailey | Mar. 8, 1938 |
| 2,142,289 | Sloan | Jan. 3, 1939 |
| 2,185,394 | Arbogast | Jan. 2, 1940 |
| 2,484,127 | Stelzer | Oct. 11, 1949 |
| 2,718,119 | Prince | Sept. 20, 1955 |
| 2,752,124 | Nofziger | June 26, 1956 |